(12) United States Patent
Cardi et al.

(10) Patent No.: US 8,707,993 B2
(45) Date of Patent: Apr. 29, 2014

(54) COAXIAL QUICK COUPLING

(75) Inventors: Massimo Cardi, Pandino (IT); Mauro Rambaldini, Cernusco sul Naviglio (IT)

(73) Assignee: Faster S.p.A., Milan (IT)

( * ) Notice: Subject to any disclaimer, the term of this patent is extended or adjusted under 35 U.S.C. 154(b) by 172 days.

(21) Appl. No.: 13/234,339

(22) Filed: Sep. 16, 2011

(65) Prior Publication Data

US 2012/0234415 A1 Sep. 20, 2012

(30) Foreign Application Priority Data

Sep. 16, 2010 (EP) .................................. 10425299

(51) Int. Cl.
*F16L 37/32* (2006.01)
*F16K 31/06* (2006.01)
*F16L 37/34* (2006.01)

(52) U.S. Cl.
USPC .................. 137/614.03; 137/595; 137/614.04

(58) Field of Classification Search
USPC ...................... 137/614.04, 614.03, 594, 595; 251/149.1, 149.6
See application file for complete search history.

(56) References Cited

U.S. PATENT DOCUMENTS

| 4,827,960 A | 5/1989 | Nitzberg et al. |
| 6,050,297 A | 4/2000 | Ostrowski et al. |
| 7,147,003 B2 | 12/2006 | Maldavs |

FOREIGN PATENT DOCUMENTS

| GB | 2112094 | * 12/1981 | .............. F16L 37/28 |
| SE | 531081 | 12/2008 | |

* cited by examiner

*Primary Examiner* — Kevin Lee
*Assistant Examiner* — Michael R Reid
(74) *Attorney, Agent, or Firm* — Stetina Brunda Gared & Brucker

(57) ABSTRACT

A coaxial quick coupling suitable for being employed in very high pressure applications in the field of emergency tools, such as shears, retractors, cylinder lifters and the like, and/or in the construction field. The coupling according to the present invention is characterized in that it has a high standardization of the internal components, different components being used both in the male coupling and in the female coupling, and in that it has a greater structural and constructional simplicity, also having few points of elastomeric sealing, which results in longer duration and greater reliability of the coupling itself.

9 Claims, 6 Drawing Sheets

COAXIAL QUICK COUPLING

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a coaxial quick coupling which is typically suitable for being employed in very high pressure applications in the field of emergency tools, such as shears, retractors, cylinder lifters and the like, and/or in the construction field.

BRIEF SUMMARY

For this type of application, a power source and a tool are typically connected to each other by a pair of hoses, one for the high pressure delivery and the other for the low pressure return. Quick couplings are employed for interfacing the control unit with the pipes and the pipes with the tool, and the object of the present invention is a particular type of quick coupling.

As mentioned, a peculiar feature of the applications of the quick couplings in this field are the very high delivery pressures when the tool is working, with pressures even reaching 72 MPa. Other requirements are then those of increased functional reliability and facility of use. Therefore, the couplings employed in this field should be simple from the constructional point of view, in order to ensure the required reliability, handy and easily connectable and disconnectable, lightweight and generally equipped with certain devices capable of guiding the user in the connection, so that it may be performed without errors and also under conditions of poor visibility.

The possibility of relatively rotating the connected parts should also be ensured, and the internal short-circuiting of the control unit side as well as an accidental anti-release safety system should be provided.

For connecting the two lines to the utility or source, the currently known technical solutions include using a pair of quick couplings of the ring-nut retraction type capable of reaching the operating pressure required.

Thereby, there is a quick coupling for the delivery line in which there is high pressure and a quick coupling for the low pressure return line.

In this case, the user typically couples the two couplings with time waste and error risks, due to the confusion between the two couplings if the type of coupling is the same.

In order to overcome these drawbacks, couplings which allow the connection operations to be simplified by integrating the two high and low pressure lines in a single coupling have thus been developed and are known in the field.

Therefore, the so-called "side-by-side" solutions where the two lines remain separate and are placed side-by-side while using a quick, monobloc coupling, and the so-called "coaxial" solutions, which integrate the two lines one within the other, have been developed.

However, both these solutions have some drawbacks.

The "side-by-side" solution requires for example that the two lines are in some way marked so that there is no risk of inverting the lines, especially in the case of manoeuvres in which the operator has not a complete view of the lines and should mainly move about while relying on touch.

There is also a need to ensure the free rotation of at least one of the two parts to allow the lines to be correctly connected with a significant impact on the length of the quick coupling. Moreover, there are greater diameter size and push sections in this case.

FIG. 1 shows a typical solution of this "side-by-side" type of couplings. As may be noted in the figure, the lines are placed side-by-side and the presence of an internal reference pin and of outward protruding screws give the user tactile confirmation of the related correct positioning of the two parts.

The so-called "coaxial" type was then developed by the same applicant as well as by other companies specialized in the field in order to exactly overcome the set forth drawbacks which involve the solutions of "side-by-side" type.

In this particular type of coupling, seen in FIG. 2 for example, the two delivery and return lines are coaxial with each other.

Due to safety reasons and constructional opportunities, the higher pressure line, i.e. the delivery line, is normally arranged inside and the low pressure line, i.e. the return line, is arranged outside to surround the former. Solutions provided with coaxial pipes forming a sort of coupling extension are also known on the market.

The applicant developed and marketed a coaxial quick coupling in the past, suitable for being connected with "traditional", i.e. not coaxial, pipes. Therefore, the coaxial couplings of known type developed by the applicant have adaptors at the back provided with classic separate female connections for the delivery (high pressure) lines and for the return (low pressure) lines. Thereby, the quick coupling may be also used as a "retrofit" on existing systems equipped with a quick coupling for each line and, obviously, with separate pipes. For the coaxial couplings of known type made by the same applicant, the connection occurs by pushing, i.e. by simply pushing a coupling into the other (the male into the female) without the need to orientate the two parts and without the need for reference pins or external and/or internal backings.

In order to complete the framework of the state of the art, prior patents U.S. Pat. No. 7,147,003 and SE531081 are mentioned here as examples of coaxial couplings.

A common feature of the coaxial quick couplings illustrated hereto is that of using two coaxial paths, an internal one for the high pressure delivery line and an external one for the low pressure return line.

The two coaxial paths separate in the rear zone of the two parts, male and female, of the quick coupling thus allowing the two standard, separate pipes to be used (generally indicated by "P" for the high pressure one and by "T" for the low pressure one).

Another common feature of the coaxial quick couplings under discussion is the presence of "short-circuiting" between the internal and external lines in one of the two semi-couplings. "Short-circuiting" consists in reciprocally communicating the internal and external lines of the coupling connected to the power source control unit when this is in uncoupled condition.

This condition is commonly required by the application so as to allow the control unit to be started before connecting the equipment by means of the quick coupling. In typical applications of emergency situations, for example, the control unit is indeed normally placed some meters apart from the point where the final utility is required, and the need to change the tool during the emergency operations often occurs, as different tools may be required to complete the operations required.

Although they move about within the scope of these features, the solutions known from the above-mentioned prior patents have some drawbacks.

Among these drawbacks there is undoubtedly the significant structural complexity of both the known solutions, which results in assembly difficulty and reliability limitations. Moreover, a drawback which afflicts both the solutions is the low standardization of the internal components, as almost no component is common to both the male coupling and to the female coupling, and the significantly small passages, especially in the internal, high pressure line, display the risk of overheating the system also due to the high localized load leakages.

Furthermore, the coaxial coupling object of prior document U.S. Pat. No. 7,147,003 has a further drawback: a high number of elastomeric sealing elements, generally consisting of o-rings, increases the risk of extrusions and fluid leakages. Another disadvantage which afflicts the solution object of U.S. '003 consists of the risk of closing the valves of the high pressure line in the case of variations in the fluid speed. Finally, it is pointed out that the coupling object of patent U.S. '003 has a small sized ring nut which does not certainly facilitate the use of the coupling by the operator when he/she wears safety gloves commonly used by emergency staff.

The solution object of prior patent SE531081 is instead characterized by a connection system by means of the ring nut rotation, and has a further drawback in not being provided with any safety system against accidental releasing. Thereby, the coupling may be erroneously uncoupled in case of twisting of the tubes by simply causing a relative rotation between the two parts.

Again, a further drawback which afflicts the solution known from this prior document consists in the need to orientate the reference pins with the corresponding milling during the step of connecting.

It is therefore the main task of the present invention to provide a quick coupling of coaxial type which allows to overcome the drawbacks afflicting the solutions of known type.

Therefore, in particular, the object of the present invention within the scope of this task is to provide a quick coupling of coaxial type which has a greater structural and constructional simplicity, in particular which has few elastomeric sealing points, resulting in longer duration and higher reliability of the coupling itself.

Again, it is the object of the present invention to provide a quick coupling of coaxial type in which the passage sections are larger in size and in which the fluid moves in a linear flow without sudden changes of direction.

It is also an object of the present invention to provide a coaxial quick coupling which is free from the problems of closing the valves of the high pressure line due to variations in the fluid speed.

Not last, the object of the present invention is to provide a coaxial quick coupling which has a high standardization of the internal components, different components being employed both in the male coupling and in the female coupling.

This task and these and other objects which will become more apparent hereinafter are achieved by a coaxial quick coupling as claimed in the appended claims.

BRIEF DESCRIPTION OF THE DRAWINGS

Further features and advantages of the present invention will become more apparent from the following detailed description, provided by way of non-limiting example and illustrated in the accompanying drawings, in which.

DETAILED DESCRIPTION

Figure 1:
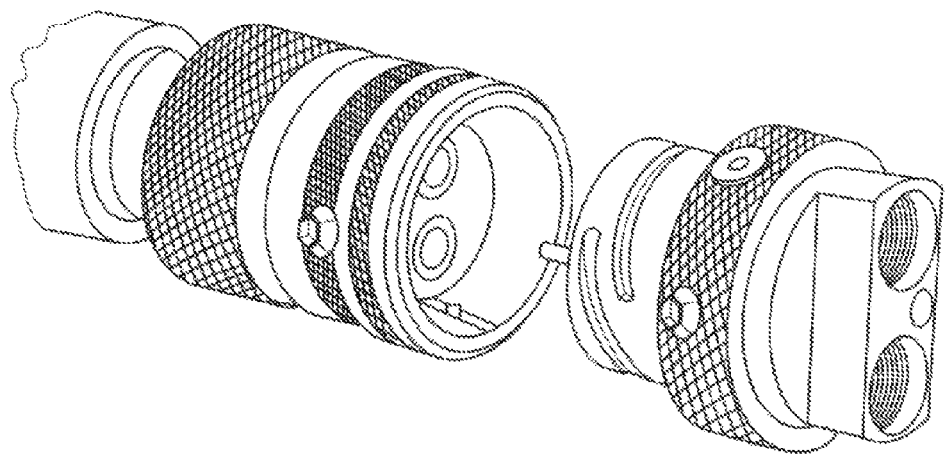
FIG. 1 shows an example of quick coupling of "side-by-side" type known from the state of the art.
Figure 2:
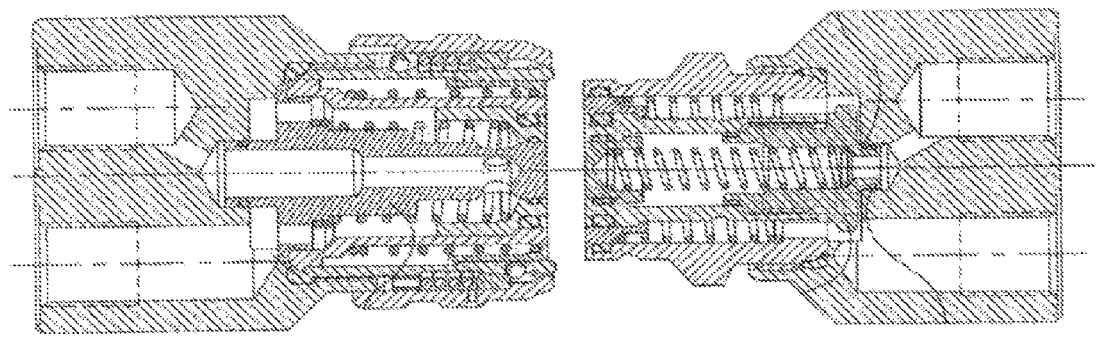
FIG. 2 shows an example of quick coupling of "coaxial" type known from the state of the art.
Figure 3:
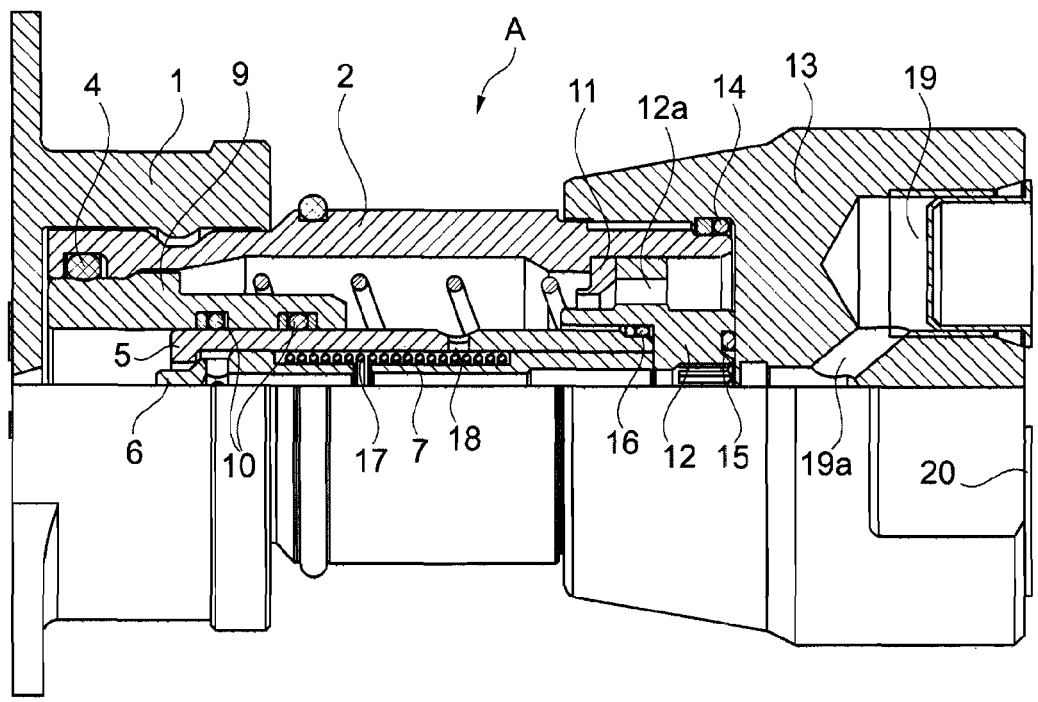
FIG. 3 shows the male coupling of the coaxial coupling according to the present invention in a sectional view with a longitudinal plane.
Figure 4:
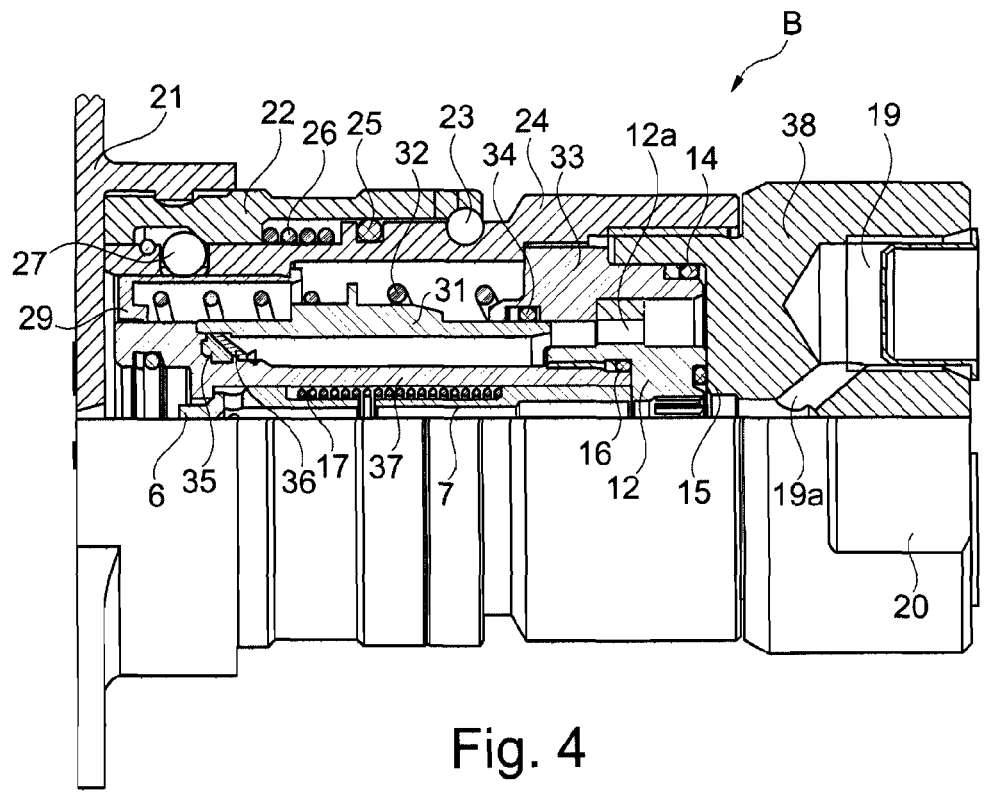
FIG. 4 shows the female coupling of the coaxial coupling according to the present invention in a sectional view with a longitudinal plane.
Figure 5:
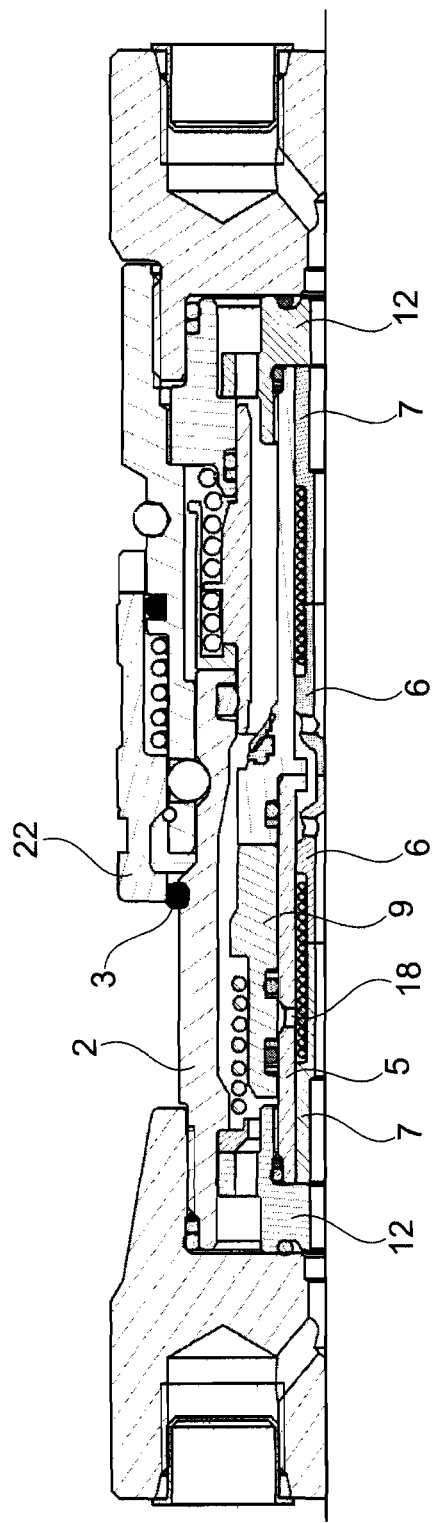
FIG. 5 shows the coaxial coupling according to the present invention, with male and female connected, in a sectional view with a longitudinal plane.

According to a preferred embodiment of the present invention shown in the mentioned FIGS. 3 to 5 by way of non-limiting example, the coaxial quick coupling according to the present invention comprises a male coupling generally indicated by letter A, and a female coupling, generally indicated by letter B in the accompany FIGS. 3 and 4, respectively.

In FIG. 3, reference numeral 1 indicates the protection plug generally made of plastic material to be used when the coupling is uncoupled for protecting the coupling itself from dirt.

By way of non-exhaustive example, the figure shows the plug in the version made of plastic material. Corresponding versions made of metal material are also available for a greater wear resistance.

Figure 6:
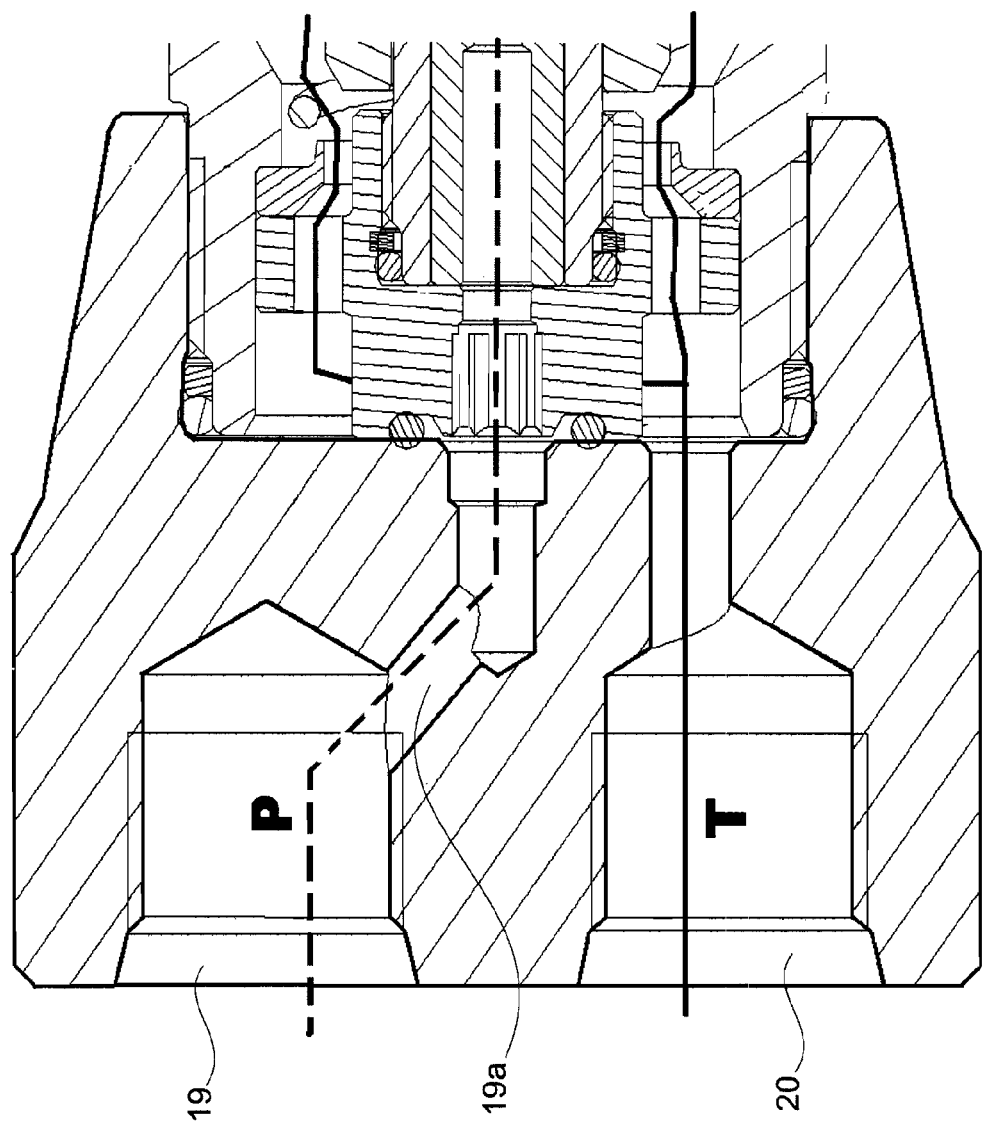
FIG. 6 shows a detail of the adaptor of the male coupling according to the present invention in a sectional view with a longitudinal plane.
Figure 7:
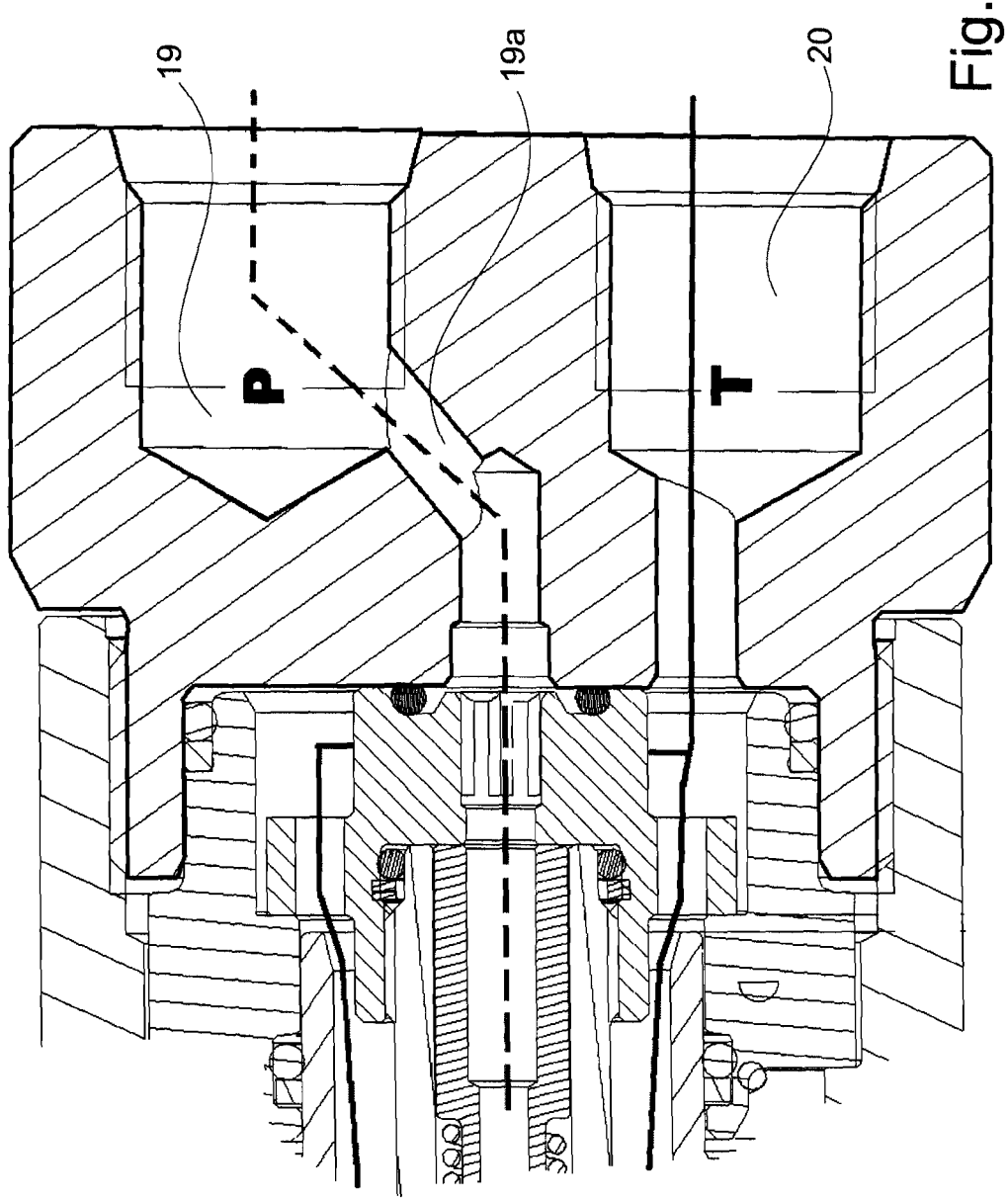
FIG. 7 shows a detail of the adaptor of the female coupling according to the present invention in a sectional view with a longitudinal plane.

An adaptor 13 for the connection to the pipes is in the rear part of the coupling. A threaded inlet 19 is obtained on the adaptor, and a threaded connection 20 is obtained outside the adaptor. FIG. 6 shows a detail, in a cross-section view, of the adaptor 13 of the male coupling A. Instead, FIG. 7 shows the same cross-section view of the adaptor 38 of the female coupling B. The broken line indicated by P indicates the path of the high pressure fluid, while the solid line T indicates the path of the low pressure fluid. The fluid entering the coupling at the threaded inlet 19, which connects the coupling itself to the high pressure or delivery line, is conveyed toward the internal channelling through the internal axial passage of component 12.

From here, the fluid axially continues toward spacer 7 and stops because the metal sealing valve 6 is in abutment against body 5.

Valve 6 is kept in closed position in abutment against body 5 by the internal pressure and by the elastic means 17, e.g. a helical spring as shown in the figures interposed between spacer 7 and valve 6. Spacer 7 in turn is in abutment against the back of a component 12 for the axial channelling of the low pressure flow, and therefore at last said elastic means 17 act between said valve 6 and said component 12, although by means of the spacer 7.

In order to obtain the above-mentioned short-circuiting of the fluid, when the male coupling is disconnected from the female, or exactly in the configuration in FIG. 3, a radial hole 18 is obtained on the internal body 5. As a technical contrivance, it is worth noting that said radial hole 18 should be obtained so as to avoid overflows which could damage the sealing elements, in the example consisting of the o-rings 10 provided on the valve body 9, which provide the fluid seal outside body 5.

As the metal seal valve 6 is closed on the internal body 5 and as there is no other way out, the pressurized fluid from inlet 19 crosses the radial hole 18 and returns to the control unit by running back through the low pressure channel through spacer 11 and through the external channels 12a of component 12, thus exiting from the threaded connection 20 obtained on adaptor 13. In this configuration, the fluid has no other way out because, as mentioned, the o-ring 10 assembled on the valve body 9 and the shaped sealing gasket 4 on the valve body 9 prevent the fluid from leaking from the front part of the coupling, as does the metal seal valve 6 which is in closed position.

The valve body 9 is kept in closed position by the internal pressure and by a spring which, at the back, is in abutment against spacer 11.

The o-ring 15 is frontally assembled inside a slot on component 12 and ensures the sealing action with a small push section, thus preventing the high pressure fluid running through the central conduit from coming in contact with the low pressure fluid which runs through the external conduit, and vice versa, with the coupling being connected.

The same function is ensured by the gasket 16 with corresponding anti-extrusion ring and by the gaskets 10 which, again with the coupling being coupled, are one to the right and the other to the left of the radial hole 18, with the push of the fluid acting on identical diameters and therefore in a hydraulically balanced position, as shown in FIG. 5.

With the coupling being coupled (to this end refer again to FIG. 5), the short-circuiting of the lines is thus automatically prevented as the valve body 9 is retracted in abutment on component 12.

Again with the coupling being coupled, valve 6 retracts under the push of the corresponding valve 6 in the female coupling, which will be described below. Moreover, a rear mechanical abutment is ensured by means of the contact of the valve 6 itself with spacer 7 both in the male coupling and in the female coupling. This contrivance contributes to eliminating passage decreases in case of variations in the fluid speed.

Indeed, due to a very accurate designing of tolerances and clearances, so the valves are mechanically blocked in the position of maximum opening and are thus insensitive to variations of flow rate and speed which, in case movements of the valves were allowed, would inevitably cause a partial closing thereof in the flow direction with decreases of passage and increases of the localized load leakage.

Gasket 3 assembled in a specific seat obtained on the main body 2 prevents dirt, dust and other external agents from entering when the coupling is coupled, as it is in contact with the ring nut 22, consisting of a substantially cylindrical hollow body arranged outside the female coupling B. Such a configuration is also seen in FIG. 5.

The main body 2 of the male coupling A is assembled inside adaptor 13 and the hydraulic sealing between the two components is ensured by the gasket 14 with corresponding anti-extrusion ring.

Spacer 11 in the male coupling A allows the component 12 to be used also in the female coupling part B, as will be better seen below, thus obtaining a greater standardization. In addition, other components are used both in the male coupling and in the female coupling: as better seen below, they are spacer 7, spring 17, gaskets 10 with corresponding anti-extrusion devices, as well as gaskets 14 and 16 with corresponding anti-extrusion and gasket 15. This inter-changeability of the components results in an apparent benefit in terms of cost containment for a greater standardization.

With particular reference to FIG. 4, the coaxial female coupling B according to the present invention will now be described.

Reference numeral 21 indicates the protection plug which may be applied to the front part of the coupling when the latter is uncoupled for generally protecting it from dust and dirt.

By way of non-exhaustive example, FIG. 4 shows the plug in the version made of plastic material. Corresponding versions made of metal material are also available for a higher wear resistance.

With reference to the axial delivery line, i.e. high pressure line, in this case the threaded inlet 19 is also obtained on the adaptor 38 and allows the coupling to be connected to the delivery conduit.

Through the internal channelling 19a, the fluid is conveyed toward the axial conduit obtained on component 12, which is the same component employed on the male coupling A, as seen.

Also in this case, the fluid then continues through the axial conduit of spacer 7 and stops because, with the coupling being disassembled, the metal seal valve 6 is in abutment on the front body 37.

Valve 6 is kept in closed position by the internal pressure and by spring 17 interposed between valve 6 and spacer 7.

Unlike the previous illustration about the male coupling A, in this case there is no short-circuiting between the two lines because, as mentioned, the female coupling will be connected, in the operating configuration, to the utility and not to the power source.

In the example shown in the figures, the gasket 15 consisting of an o-ring is frontally assembled inside a slot obtained on component 12 and ensures the sealing with a small push section thus preventing, even with the coupling being disconnected in addition to being connected, the high pressure fluid running through the central delivery conduit from coming in contact with the low pressure fluid which runs through the external conduit, and vice versa.

The same function is ensured by gasket 16 with corresponding anti-extrusion ring which ensures the hydraulic sealing between the components 12 and 37.

Instead, with regard to the low pressure line, there is a threaded inlet 20 obtained on adaptor 38. FIG. 7 shows the complete section of the adaptor, noting the fluid paths P (high pressure) and T (low pressure).

The fluid is conveyed through the external passages 12a of component 12.

The fluid continues through the slider 31 and stops because the slider itself is in closed position, with the coupling not being connected.

Moreover, the hydraulic sealing is ensured by the shaped gasket 35 assembled on component 37, and secured in its own seat by means of the packing ring 36 which is conveniently plastically deformed, and is ensured at the back by the o-ring 34, with the corresponding anti-extrusion assembled in the specific seat obtained on body 33.

With the coupling being disconnected, slider 31 is kept in closed position by the internal pressure and by spring 32.

The o-ring 14 with corresponding anti-extrusion ensures the hydraulic sealing between adaptor 38 and body 33.

Again with the coupling being disconnected, the ball wheel 27 is in a radially expanded position. Indeed, the balls are supported at the bottom by the external slider 29 which serves the function of keeping the balls 27 in the radially expanded position so that they are inserted into the grooves conveniently provided in the ring nut 22 thus keeping it in the retracted position even though the spring 26 is compressed.

The o-ring 25 ensures the absence of dirt introductions into the device, both with the coupling being disconnected and with the coupling being connected.

With the coupling being disconnected, a pair of safety balls 23 assembled on body 24 are employed inside the corresponding milling or grooves obtained on the ring nut.

During the step of connecting, body 2 of the male coupling A pushes the external slider 29 of the female coupling which retracts, therefore it moves to the right in the drawing in FIG. 4. During this movement, the slider comes in abutment on component 31 and, continuing this movement, retracts it completely to the right. So doing, the passage of the low pressure line is opened, consisting of the sealing provided by the shaped gasket 35 on component 31, as mentioned.

When body 2 has completed its stroke, the ball wheel 27 is at the groove obtained outside the body 2 of the male coupling, as shown in FIG. 5, and therefore the male is coupled into the female, as the ball wheel is free to radially compress inward, while freeing the ring nut 22 which, under the bias of spring 26, is able to be released to the right until coming in abutment against the protective gasket 3 assembled on the male coupling.

When the ring nut 22 has completed the movement, the ball wheel 27 is forced into the radially compressed position inside the groove on body 2, thus determining the sealing of the coupling as the male and female couplings are mechanically blocked in the connected position.

Figure 8:
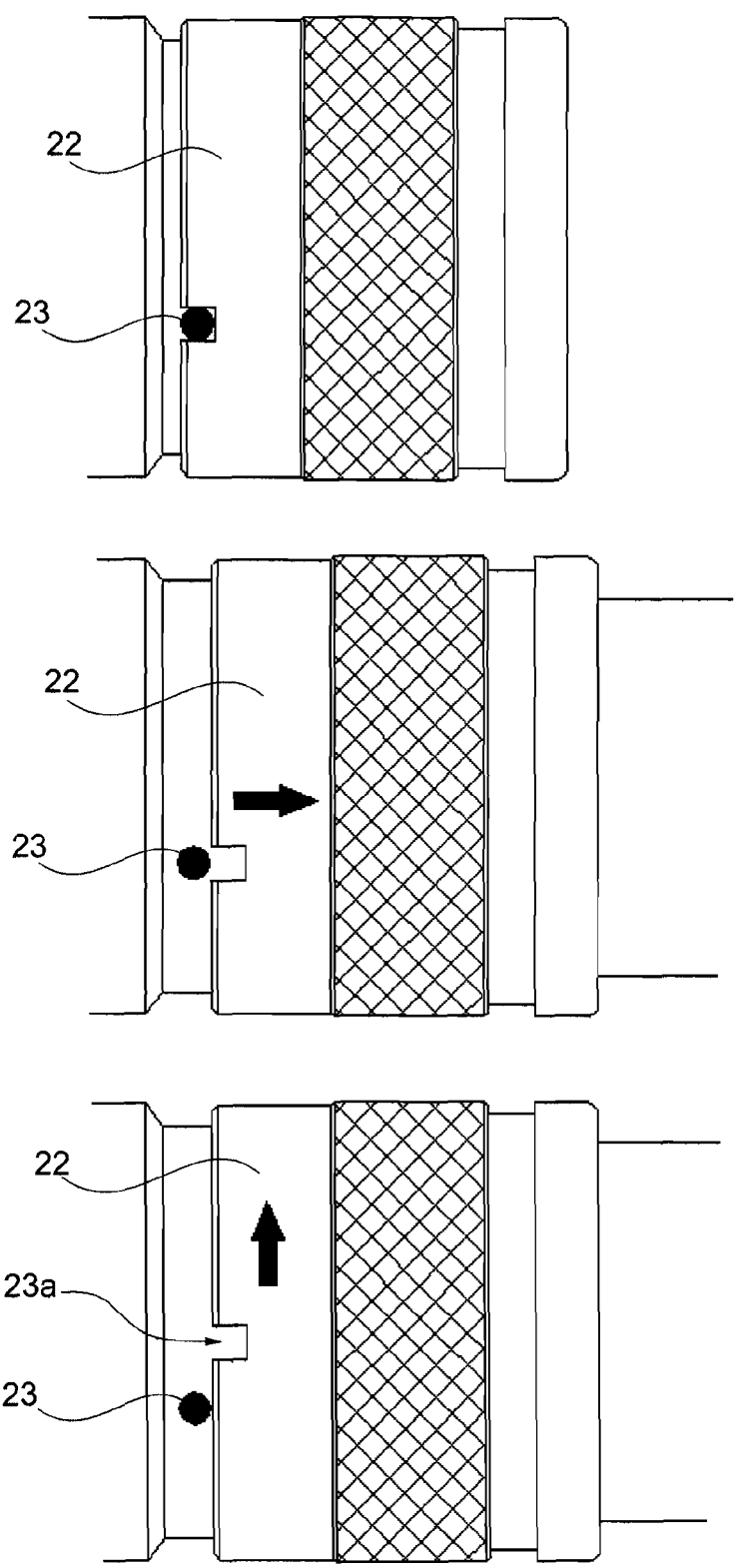
FIG. 8 shows a sequence of the steps of uncoupling the safety ring nut device of the coupling according to the present invention.

The movement of the ring nut 22 to the right disengages the two safety balls 23 from the corresponding grooves 23a having a substantially longitudinal, open development to receive said balls 23. A slight rotation of the ring nut prevents the accidental retraction of the ring nut itself as the millings 23a are no longer at the balls 23. To disconnect the male from the female, the ring nut should be repositioned with the millings 23a at the balls 23. From the top to bottom, FIG. 8 shows the sequence of intervention of the safety device consisting of the ring nut.

In addition to opening the low pressure channel, the same push connecting movement also opens the high pressure channel at the same time. During the connection movement, the two valves 6 of the male coupling A and of the female coupling B are indeed in mutual contact and simultaneously retract thus opening the high pressure passage for the fluid. Gasket 10 prevents the fluid from leaking from the high pressure line with the coupling being connected.

Moreover, a rear mechanical abutment is ensured by means of the contact of the valve 6 itself with spacer 7 both in the male coupling and in the female coupling.

This contrivance contributes to eliminating passage decreases in case of variation in the fluid speed.

Indeed, due to a very accurate designing of tolerances and clearances, the valves are so mechanically blocked in the position of maximum opening and are therefore insensitive to variations of flow rate and speed which, in case movements of the valves were allowed, would inevitably cause a partial closing thereof in the direction of the flow with passage decreases and increases of the localized load leakage.

How the coaxial quick coupling according to the present invention achieves the suggested object and objectives has thus been shown.

In particular, how the coaxial quick coupling according to the present invention has a high structural and constructional simplicity has been illustrated, in particular due to a small number of elastomeric sealing points, which increases the life and reliability of the coupling itself.

Moreover, how the coupling according to the present invention has passage sections of increased size and in which the fluid moves in a linear flow without sudden changes of direction has been shown.

Not last, how the coaxial quick coupling according to the present invention has a high standardization of the components has been shown, different components being employed both in the male coupling and in the female coupling, thus allowing the production and construction costs to be optimized.

Several modifications may be made by a person skilled in the art without departing from the scope of protection of the present invention.

Therefore, the scope of protection of the claims should not be limited by the disclosures or by the preferred embodiments shown in the description by way of example, but rather the claims should comprise all features of patentable novelty inferable from the present invention, including all features which would be treated as equivalents by a person skilled in the art.

What is claimed is:

1. A coaxial quick coupling comprising a male component and a female component wherein at least two coaxial paths are identified, one for a high pressure line and one for a low pressure line, wherein each of said male and female components comprises a component for channelling the low pressure flow and an axial, metal seal valve on the high pressure line kept in place by elastic means acting between said valve and said component, the valve, the component for channelling the low pressure flow and the elastic means on the high pressure line of the male component being identical to the corresponding elements, respectively to the valve, to the component for channelling the low pressure flow and to the elastic means on the high pressure line of the female component, and in that said female component further comprises a slider which, with the coupling disconnected, is kept in closed position against a front body placed outside said axial valve by a spring thus closing the low pressure line, and which is shifted by the male component against the spring when the coupling is connected, thus opening the low pressure line.

2. A coaxial quick coupling according to the claim 1, wherein said axial valve creates a metal sealing for the high pressure fluid in said male component, on an internal body outside said valve and coaxial thereto.

3. A coaxial quick coupling according to one of the preceding claims, wherein said axial valve creates a metal sealing for the high pressure fluid in said female component, on a body outside said valve and coaxial thereto.

4. A coaxial quick coupling according to claim 2, wherein said male component comprises, on said internal body, a radial hole which allows the flow of pressurized fluid to be short-circuited when, with the coupling being disconnected, the valve of said male component is closed on said internal body.

5. A coaxial quick coupling according to claim 4, wherein said male component further comprises a valve body, arranged outside said internal body and supporting a pair of sealing elements placed so that when the male and female components are connected, said radial hole is placed in an intermediate position between said sealing elements.

6. A coaxial quick coupling according to claim 5, wherein said female component comprises a ring nut slidingly associated with the outside of said female component and suitable for cooperating with a ball wheel radially protruding from the female component in order to make the connection of the two male and female components.

7. A coaxial quick coupling according to claim 6, wherein said female component is equipped with one or more safety balls suitable for selectively interacting with one or more grooves conveniently obtained on said ring nut.

8. A coaxial quick coupling according to claim 7, wherein said female component further comprises an external slider placed outside said front body and adapted to support the balls of said ball wheel at the bottom.

9. A coaxial quick coupling according to claim 8, wherein said external slider of said female component is pushed during the step of coupling by a body which externally defines said male component.

* * * * *